March 2, 1965 R. M. CURCIO 3,171,175

METHOD OF BONDING A STYLUS TIP

Filed Sept. 11, 1958

INVENTOR.
Rinaldo M. Curcio
BY
Mason, Kolehmainen, Rathburn and Wyss.
Attorneys.

United States Patent Office 3,171,175
Patented Mar. 2, 1965

3,171,175

METHOD OF BONDING A STYLUS TIP

Rinaldo M. Curcio, Skokie, Ill., assignor to Fidelitone, Incorporated, Chicago, Ill., a corporation of Illinois Filed Sept. 11, 1958, Ser. No. 760,513
6 Claims. (Cl. 22—202)

This invention relates to a method of and means for making a stylus element and, more particularly, to a method of and means for bonding a diamond tip to a stylus shank.

In transducer assemblies for reproducing sound from grooved records, it is desirable for the record engaging tip of the stylus element to be of a material having the greatest possible hardness in order to provide the most faithful reproduction of the recorded sound. If the record engaging tip becomes distorted in shape from abrasion with the moving record, the tip may cut the relatively soft material of the record and thus distort the groove modulation. Further, a reduction in the size of or a distortion in the shape of the tip may cause the tip to fail to follow the groove modulation with the result that portions of the recorded signals are not accurately and faithfully reproduced.

Thus, many stylus tips are formed of precious stones, such as sapphires and diamonds, which possess the desired hardness characteristic. In forming a stylus element, a small diamond crystal is bonded to a stylus shank element that is more readily secured to the transducer unit. The bonded diamond is then ground to a generally right conical point to provide a record engaging tip. Although a diamond possesses considerable natural hardness, certain planes of the diamond crystal possess greater hardness, and these planes must be located as close as possible to the record tracking points of the stylus tip in order to obtain optimum wear resistance in sound reproduction. Further, even though the hardness planes of the diamond crystal are located adjacent the tracking points, these planes must be properly oriented relative to the conical point to prevent the cleavage planes in the crystal from extending across the conical point with the attendant danger that the tip will fail due to the application of a lateral shock.

Accordingly, one object of the present invention is to provide a new and improved method of making sylus elements.

Another object is to provide a method of bonding a diamond crystal to a supporting element, such as a stylus shank or a tool member.

A further object is to provide a method of bonding a diamond stylus tip to a metal shank with the various planes of the diamond crystal oriented in certain predetermined manners.

Another object is to provide a method of bonding a diamond stylus tip to a metal shank while maintaining the diamond crystal in a predetermined alignment and orientation relative to the shank.

Another object is to provide a new and improved fixture for bonding a metal shank to a diamond crystal while maintaining a predetermined orientation of the crystal relative to the shank.

In accordance with these and many other objects, an embodiment of the invention comprises a fixture for bonding diamond crystals to metallic shanks which includes a pair of plates or supporting members formed of heat resistant material. A first one of the plates is provided with a plurality of spaced recesses each having a configuration conforming to the shape of the portion of the diamond crystal that is to be supported. For instance, if the diamond crystals used to provide a stylus tip are octahedral in shape, the recesses formed in the first plate are generally pyramidal in configuration so that each of the diamond crystals is held in a predetermined position of alignment and orientation relative to the first plate. Although these recesses can be directly formed in the first plate, a preferred embodiment of the invention includes a plurality of ceramic cups having recesses of the desired configurations which are removably mounted in openings formed in the upper surface of the first plate. The second plate of the assembly fixture is provided with a plurality of vertically extending holes or openings each having a diameter substantially equal to the diameter of the stylus shank. The second plate is detachably mounted on the first plate with each of the openings therein aligned with a recess in the adjacent surface of the first plate.

In performing the new and improved method of bonding the diamond crystals to the metal shanks, a diamond crystal having a shape conforming to the configuration of the recesses in the first plate is placed in each of these recesses in a properly aligned position. If desired, a drop of cement can be placed in each of the recesses to detachably secure the diamond crystal therein. In this position a portion of the crystal is received within the recess in the first plate and the remainder of the crystal extends upwardly above the upper surface of the plate. In order to permit solder to form an adequate bond between the metal stylus shank and the crystal, a suitable flux is then applied to the exposed portions of the diamond crystals.

The second plate is then assembled on the first plate with the holes in the second plate aligned with the recesses in the first plate so as to provide substantially right cylindrical cavities into which the upper ends of the diamond crystals extend. A predetermined mass or pellet of solder is then dropped into each of the holes so that the lower end of the solder pellet rests on the upper end of the crystal. A metallic stylus shank is then inserted into each of the holes or openings so that lower end of the shank engages the upper end of the solder pellet. In this position the axis of the shank is aligned with the diamond crystal mounted on the first plate.

The assembly fixture is then inserted into a furnace having a controlled inert atmosphere or a vacuum and heated to a suitable temperature. This heating melts the solder to provide a bond between the metal shank and the diamond crystal. As the solder pellet melts, the molten solder flows downwardly around the exposed faces of the crystal under the force of the superimposed shank which also moves downwardly until the lower end of the shank engages the uppermost extremity of the crystal. This downward movement of the shank provides a continuous force acting on the molten solder and improves the degree of bonding between the shank and the crystal. Following the completion of the heating operation, the assembly fixture is removed from the furnace, and the plurality of stylus elements, each comprising a diamond crystal bonded to the end of the shank, is removed. The individual stylus elements are then placed in suitable grinding equipment so that a substantially right cylindrical cone is formed in the diamond to provide a record engaging tip. Inasmuch as the assembly fixture maintains the selected alignment and orientation between the diamond crystal and the metal shank during the bonding operation, the conical tip can be formed in the diamond with the hardest planes of the crystal disposed adjacent the tracking points and with the cleavage planes so located as to prevent the failure of the tip due to the application of a laterally directed distorting force.

Although the assembly apparatus and the method of this invention are described above with reference to bonding an unground diamond on a metal stylus shank, it is obvious that this method and apparatus can be used to bond a ground and polished diamond to the shank so that the subsequent grinding of the diamond is not required. Further, the method and apparatus can be used to bond precious stones, such as diamonds, in ground and polished or unground form to various other supporting elements such as parts of diamond tools and pieces of jewelry.

Many other objects and advantages of the present invention will become apparent from the following detailed description thereof when considered in conjunction with the drawing in which.

Figures 1, 2, 3, 4, 5, 6:
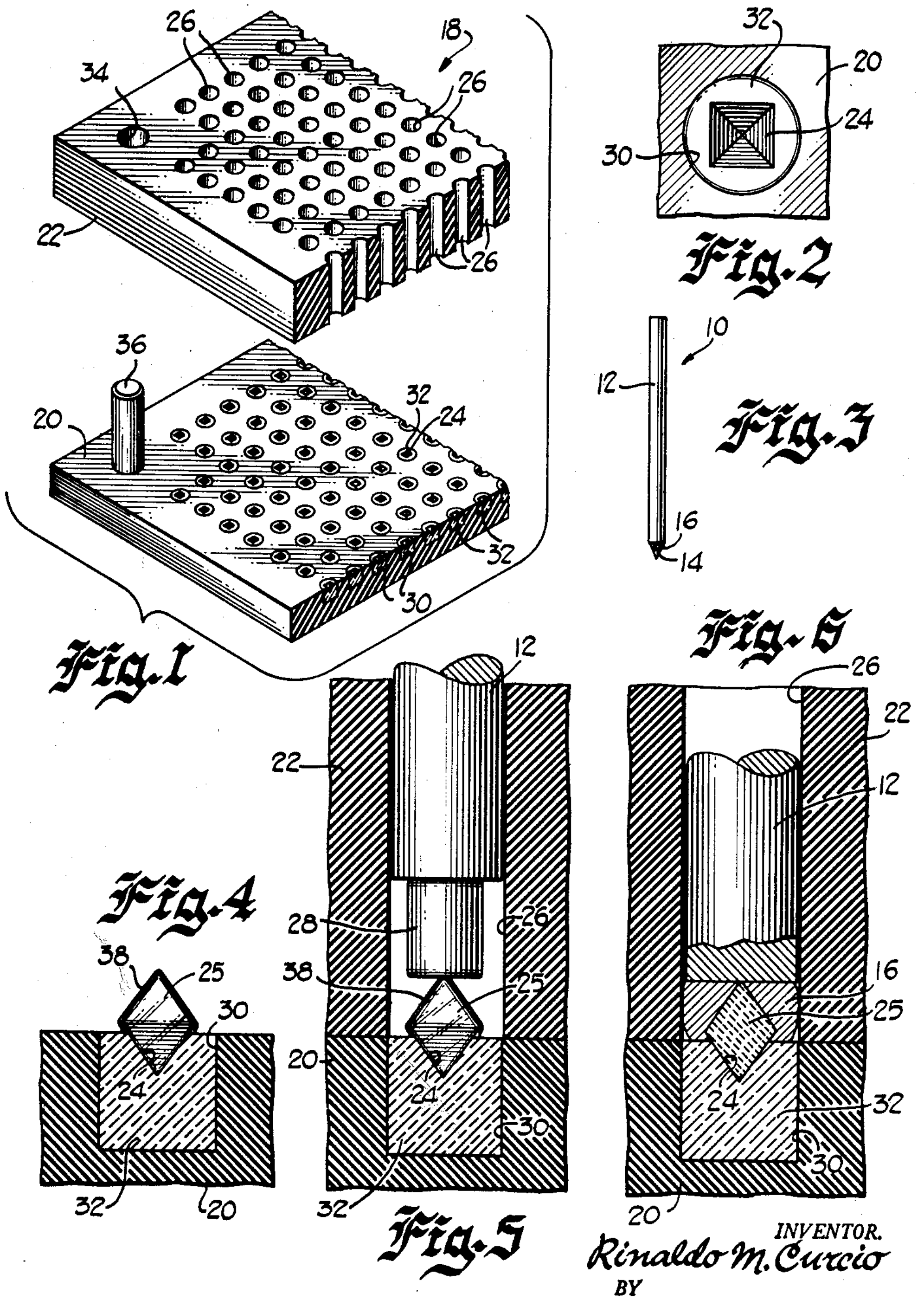
FIG. 1 is an exploded fragmentary perspective view of an assembly fixture used in bonding the tip and shank portions of a stylus element.
FIG. 2 is an enlarged top plan view of a diamond crystal supporting element used in the fixture illustrated in FIG. 1.
FIG. 3 is an elevational view of a stylus element formed by the method and apparatus of the present invention.
FIG. 4 is an enlarged fragmentary sectional view illustrating a diamond crystal supported on one portion of the fixture shown in FIG. 1.
FIG. 5 is an enlarged fragmentary sectional view similar to FIG. 4 but illustrating the complete assembly fixture with a mass of solder and a portion of a stylus shank positioned above the diamond crystal.
FIG. 6 is an enlarged fragmentary sectional view similar to FIG. 5 and illustrating the relative positions of the diamond crystal, the solder, and the shank following the bonding operation.

Referring now more specifically to the drawing, FIG. 3 illustrates a stylus element, indicated generally at 10, which is formed by the assembly apparatus and method of the present invention. The stylus element 10 comprises a right cylindrical shank element 12 to which a record engaging tip 14 is bonded by a mass of solder 16. The stylus element 10 is formed in an assembly fixture or apparatus, indicated generally as 18 (FIG. 1), which includes a first or lower plate 20 on which an upper or second plate 22 is detachably mounted. The upper surface of the lower plate 20 is formed with a plurality of spaced recesses 24 of a configuration corresponding to that of a diamond crystal 25 (FIG. 4) used in forming the tip 14. The upper plate 22 is provided with a plurality of holes or openings 26 passing therethrough, each of which is of a diameter equal to or slightly larger than the diameter of the shank 12.

When the stylus element 10 is to be formed, a diamond crystal 25 is positioned in each of the recesses 24 with the faces and planes of the crystal 25 oriented and aligned in a predetermined manner. The exposed upper faces of the crystal 25 are then coated with a suitable flux, and the plate 22 is mounted on the plate 20 with the openings 26 in alignment with the recesses 24 so that the upwardly extending portions of the crystal 25 are disposed within the openings 26 (FIG. 5). A pellet of solder 28 is then dropped into each of the openings 26 so that the lower edge of the solder pellet 28 rests on the uppermost point of the crystal 25. A shank 12 is then placed in each of the openings 26 so that the lower end of the shank 12 bears against the upper end of the solder pellet 28 and forces it into engagement with the upper end of the diamond crystal 25.

The fixture 18 is then placed in a furnace having an inert atmosphere or a vacuum and heated. This heating melts the solder 28 so that it flows downwardly around the exposed faces of the crystal 25. As the solder pellet 28 is melted, the mass of the shank 12 forces this shank downwardly until its lower end engages the upper end of the crystal 25. The pressure provided by the shank 12 aids the flux and solder in providing a good bond between the shank 12 and the diamond crystal 25. The fixture 18 is removed from the furnace and cooled, and the shanks 12 with the diamond crystals 25 bonded thereto are removed from the fixture 18. Following their removal the mass of solder 16 and the crystals 25 are abraded at high speeds to form the record engaging tip 14.

Referring now more specifically to the stylus element 10, the shank 12 thereof preferably comprises a steel pin. However, it should be understood that the supporting element embodied by the shank 12 can be formed in various other configurations and of various other metals that are suitable for use in other applications, such as diamond tools. The record engaging tip 14, which is generally right conical in shape and terminates in a semisphere of small radius, can be formed in the diamond 25 either prior to or following the bonding of the diamond to the shank 12. The diamond crystals 25 used in making articles, such as the stylus elements 10, by the use of the apparatus and method of this invention can be as small as $1/2000$ of a carat and can be of the various classical geometrical forms, such as the octahedron or dodecahedron, or combinations thereof, or distortions thereof. Diamond crystals 25 that are designated as "cleaves," "splints" and "crushed boart" are also useful. Although the diamond crystals 25 can be of these varied configurations in accordance with the article to be fabricated, a diamond 25 having one of the classical geometrical shapes is desirable in making the stylus elements 10 because of the ease with which the various planes of the diamond can be visually determined.

The diamond crystal 25 illustrated in the drawing is octahedral in shape and can be considered to comprise two oppositely extending pyramids having a common base. Since the hardest plane on a diamond is the "111" or octahedral plane, it is desirable to secure the crystal 25 to the shank 12 in such a position of alignment and orientation that, when the crystal 25 is ground to form the record engaging tip 14, the octahedral planes are located closely adjacent the tracking points of the tip. However, the cleavage planes in a diamond, which are relatively weak, are parallel to the octahedral or "111" planes. Thus, the record engaging tip 14 is likely to fail in response to the application of a lateral deflecting force if the crystal 25 is bonded to the shank 12 in a position in which the cleavage planes extend substantially transverse to the longitudinal axis of the shank 12. This tendency for the record engaging tip 14 to fail is obviated by positioning the crystal 25 so that the cleavage planes extend substantially parallel to one side of the cone forming the tip 14. Thus, the orientation and the alignment of the crystal 25 relative to the shank 12 must be carefully maintained in the desired positions during the bonding operation in order to insure the uniform production of stylus elements 10 having optimum performance characteristics.

To accomplish this, the assembly fixture 18 includes means for maintaining the stylus shanks 12 and the diamond crystals 25 in a predetermined aligned and oriented position during the bonding operation. As indicated above, the upper surface of the first or lower plate 20, which is made from a heat resistant material such as graphite, is formed with the plurality of recesses 24 having configurations corresponding to the shapes of the portions of the diamonds 25 to be supported. With the octahedral diamond crystals 25 illustrated in the drawing, the recesses 24 are substantially pyramidal in configuration to receive the lower pyramidal portion of the crystal 25. However, it should be understood that the recesses 24 can be formed in any suitable configuration in accordance with the shape of the diamonds 25 that are to be used in forming the stylus elements 10.

The recesses 24 can be directly hobbed in the upper surface of the graphite plate 20 by the use of die blank. However, in the preferred embodiment illustrated in the drawing, the lower plate 20 is formed with a plurality of spaced and aligned apertures 30 adapted to removably receive a plurality of ceramic cups 32. The upper ends of the cylindrical ceramic cups 32 are provided with the pyramidal recesses 24. By the use of the separate ceramic cups 32 to provide the diamond positioning and supporting recesses 24, the useful life of the assembly fixture 18 is prolonged. This is true because damage to a number of the recesses 24 that have been hobbed directly into the upper surface of the plate 20 would require this plate to be discarded. On the other hand, if a recess 24 in one of the ceramic cups 32 is damaged so that the diamond crystal 25 can no longer be supported in proper position, the defective ceramic cup 32 can easily be removed and replaced by another.

The upper or second supporting member or plate 22, which is also formed of a heat resistant material such as graphite, includes the plurality of vertically extending openings 26 of a diameter equal to or slightly greater than the diameter of the metal shank 12. Thus, when the plate 22 is positioned on the lower plate 20 with the openings 26 in alignment with the recesses 24, the metal shanks 12 can be dropped into the upper ends of the openings 26 and the shanks 12 are held in a position in which the longitudinal axis of the shank 12 is aligned with a line passing through the uppermost and lowermost vertices of the crystal 25. To insure the proper alignment of the openings 26 in the plate 22 with the recesses 24 in the lower plate 20, the upper plate 22 is provided with a plurality of openings 34 (FIG. 1) for slidably receiving a plurality of guide pins 36 carried on the lower plate 20.

In performing the method of the present invention, a diamond crystal 25 is manually disposed in each of the recesses 24 in the lower plate 20 with the diamond crystal 25 oriented so that the hard planes and the cleavage planes of the crystal are properly located to permit the formation of a satisfactory record engaging tip 14. The crystals 25 are held in this oriented position by the engagement of the four faces forming the lower pyramidal portion of the octahedron with the corresponding four faces of the recesses 24 illustrated in the drawing. However, if desired, a drop of cement, such as a nitrocellulose cement, can be placed in each of the recesses 24 to insure the proper support of the crystals 25 on the plate 20. If the diamonds 25 are of a shape that does not exactly conform to the configuration of the recesses 24, the diamonds are manually placed in these recesses, manually moved to properly oriented positions, and then held in these positions by the cement. The use of the cement has the additional advantage that it prevents the adherence of the solder to any of the surfaces of the crystal 25 that have been covered with cement. Thus, the cement can be manually applied to certain surfaces of a ground and polished diamond 25 to prevent the adherence of the solder and can be applied to the faces of the diamond 25 that are to be ground so as to prevent solder on these faces from clogging the grinding wheel during the subsequent grinding operation.

In order to permit the formation of a satisfactory bond between the proper surfaces of the diamond crystal 25 and the shank 12 by the use of the solder pellets 28, the upper pyramidal portion of each of the crystals 25 is provided with a coating 38 of a suitable flux. The flux preferably comprises a zirconium hydride, a titanium hydride, or other suitable hydrides, and mixtures thereof. The flux is easily coated on the portion of the diamond crystal 25 that projects above the upper surface of the ceramic cup 32 by placing the flux in an amyl-acetate vehicle and manually applying the flux to the exposed surfaces of the crystal 25 with a small brush.

The upper plate 22 is then mounted on the lower plate 20 by inserting the guide pins 36 into the openings 34 so that the openings 26 are aligned with the ceramic cups 32 with the upper portions of the diamond crystals 25 extending upwardly into the lower ends of the cavities or openings 26. If desired, the flux can be introduced into the lower end of the opening 26 at this time. Next, a solder pellet 28 is dropped into each of the openings 26 so that the lower edge of the pellet 28 rests on the upper end of the diamond crystal 25. The solder pellets 28, which may comprise an alloy of silver and copper, each contain a quantity of solder 16 sufficient to substantially fill the lower end of the opening 26 to the height of the projecting portion of the diamond 25. Following the introduction of the solder pellets 28 into each of the openings 26, a steel shank 12 is inserted into the upper end of each of these openings so that the lower end thereof rests on the upper end of the solder pellet 28. Since the diameter of the opening 26 is approximately the same as the diameter of the shank 12, the shank is held in a vertical position aligned with the vertical axis of the octahedral diamond crystal 25.

The assembly fixture 18 and the components mounted thereon are then introduced into a furnace having an inert atmosphere or a vacuum, and the furnace is heated to a suitable temperature. During this heating interval the solder pellets 28 are melted, the hydride in the flux is disassociated, and the solder goes into solution with the metal of the flux. The solder both wets the steel shank 12 and forms a bond with the diamond crystal 25 so that the shank 12 is bonded to the crystal 25. As the solder pellet 28 melts, the mass of the steel shank 12 is such as to force the molten solder downwardly around the exposed faces of the crystal 25 until such time as the uppermost point on the crystal 25 engages the lower end of the shank 12. The application of pressure to the molten solder tends to increase the effectiveness of the bond between the shank 12 and the diamond crystal 25. It should be noted that although the shank 12 and the crystal 25 move relative to each other during the heating operation, the opening 26 guides the movement of the shank 12 so that perfect alignment is maintained between the shank and the diamond crystal 25.

At the completion of the heating operation, the fixture 18 is removed from the vacuum furnace and allowed to cool. Following this, the shanks 12 with the diamond crystals 25 bonded thereto are removed from the fixture 18 and are placed in a suitable grinding apparatus in which the exposed faces of the crystal 25 are ground to form the conical record engaging tip 14.

Although the present invention has been described with reference to a single embodiment thereof, it will be understood that numerous other modifications and embodiments may be provided by those skilled in the art which will fall within the spirit and scope of the principles of this invention.

What is claimed as new and desired to be secured by Letters Patent of the United States is:

1. A method of securing a precious stone to a holder element which comprises positioning a precious stone at the bottom of a cavity; positioning a flux, a mass of solder, and said holder element within said cavity in ascending order above said stone; heating said solder to cause melted solder to flow downwardly around at least a portion of said stone; and moving said holder element downwardly under only the force of gravity as said solder melts so that said holder is secured to said stone by said solder.

2. A method of securing a stylus tip to a stylus shank which comprises holding said tip in a predetermined position, disposing a mass of solder above and in engagement with said tip, positioning said shank above and in engagement with said mass of solder, heating said solder to cause said solder to melt and flow downwardly around at least a portion of said tip, and moving said shank downwardly toward said tip under the force of gravity as said solder is melted so that said solder secures said tip to said shank.

3. A method of bonding a stylus tip of octahedral shape to a stylus shank which comprises positioning said tip with a line connecting two opposite vertices of the octahedron extending vertically upward, positioning a mass of solder in engagement with the uppermost one of said two opposite vertices, placing the lower end of said shank in engagement with said mass of solder with the longitudinal axis of said shank aligned with said line, melting said solder so that said solder flows downwardly around at least the four faces of said octahedron forming said uppermost vertex, and moving said shank downwardly under the force of gravity as solder melts until said lower end of said shank is disposed adjacent said one vertex.

4. A method of bonding a generally octahedral diamond to a right cylindrical metal shank within a generally right cylindrical cavity, which comprises mounting said diamond within said cavity with a line connecting two opposite vertices of said octahedral diamond aligned with the axis of said cavity; coating at least the four faces of said octahedral diamond forming the uppermost one of said two vertices with a flux selected from the group including titanium hydride, zirconium hydride, and mixtures thereof; placing a mass of solder including an alloy of copper and silver within said cavity adjacent said one vertex; positioning at least a portion of said shank within said cavity with the lower end of said shank engaging said mass of solder and with the axis of said shank aligned with the axis of said cavity; and heating the diamond, shank, solder, and flux in vacuum so that said solder melts to secure said diamond to said shank.

5. The method set forth in claim 4 in which the amount of solder placed in said cavity is such that when the solder is melted it substantially fills the portion of the cavity below the lower end of said shank and surrounds said four faces of the octahedral diamond.

6. A method of bonding a precious stone to a supporting element, which comprises positioning a precious stone in a desired position, coating one portion of said stone with a material that prevents the adherence of solder, applying a flux to a second portion of said stone, disposing a mass of solder adjacent said second portion of said stone, placing said supporting element adjacent and extending vertically above said solder, and heating said solder so that said solder bonds said supporting element to said second portion of said stone, said supporting elements applying a pressure to said solder during heating that is determined by the mass of said supporting element.

References Cited in the file of this patent

UNITED STATES PATENTS

| | | |
|---|---|---|
| 2,168,185 | Alexander | Aug. 1, 1939 |
| 2,240,829 | Bevillard | May 6, 1941 |
| 2,363,272 | Taeyaerts et al. | Nov. 21, 1944 |
| 2,437,212 | Schottland | Mar. 2, 1948 |
| 2,791,524 | Ozarow | May 7, 1957 |
| 2,817,885 | Long | Dec. 31, 1957 |
| 2,872,715 | Bean | Feb. 10, 1959 |